US012619758B1

(12) United States Patent
Dziuk et al.

(10) Patent No.: US 12,619,758 B1
(45) Date of Patent: May 5, 2026

(54) DIGITAL SECURITY AND ACCESS CONTROL FOR CREDIT INFORMATION

(71) Applicant: UIPCO, LLC, San Antonio, TX (US)

(72) Inventors: Janelle Denice Dziuk, Falls City, TX (US); Jon D. Mceachron, Boerne, TX (US); Steven Michael Bernstein, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 381 days.

(21) Appl. No.: 17/851,690

(22) Filed: Jun. 28, 2022

(51) Int. Cl.
*G06F 21/62* (2013.01)
*H04L 9/40* (2022.01)

(52) U.S. Cl.
CPC ...... *G06F 21/6227* (2013.01); *G06F 21/6245* (2013.01); *H04L 63/0807* (2013.01);
(Continued)

(58) Field of Classification Search
CPC . H04L 63/08; H04L 63/0807; H04L 63/0838; H04L 63/0846; H04L 63/083; H04L 63/108; H04L 63/10; H04L 63/0823; H04L 63/0815; G06F 21/62; G06F 21/6209; G06F 21/6218; G06F 21/335; G06F 21/33; G06F 21/31; G06Q 40/03; G06Q 40/00
See application file for complete search history.

(56) References Cited

U.S. PATENT DOCUMENTS 6,711,400 B1    3/2004   Aura
8,554,674 B1    10/2013  Subealdea et al.
(Continued)

FOREIGN PATENT DOCUMENTS

KR      20220066842 A     5/2022
WO      2022231480 A2    11/2022

OTHER PUBLICATIONS

Alexandre Alapetite, "Dynamic 2D-barcodes for multi-device Web session migration including mobile phones", Technical University of Denmark, Department of Management Engineering Produktionstorvet 426-A, DK-2800 Kongens Lyngby, Denmark, doi: 10.1007/ s00779-009-0228-5. (Year: 2010).
(Continued)

*Primary Examiner* — Tae K Kim
(74) *Attorney, Agent, or Firm* — Potomac Law Group, PLLC; Dannon G. Allbee

(57) ABSTRACT

Methods and systems described herein are directed to controlling access to and the distribution of credit information. A credit information access manager can maintain accounts for users and third party accessors wishing to access user credit information. The credit information access manager to generate an identifier to authorize a third party's access to a user's credit information, which can be associated with one or more deauthorization conditions. When the third party requests access to a user's credit information with the identifier, the credit information access manager can determine whether the identifier is valid or expired based on the one or more deauthorization conditions. The credit information access manager can automatically and dynamically revoke identifier to limit a user's exposure to identity theft and financial crimes.

19 Claims, 13 Drawing Sheets

(52) U.S. Cl.
CPC ........ H04L 63/0838 (2013.01); H04L 63/108 (2013.01); *G06F 2221/2115* (2013.01); *G06F 2221/2137* (2013.01)

(56) References Cited

U.S. PATENT DOCUMENTS

| | | | |
|---|---|---|---|
| 8,817,961 B1 | 8/2014 | Sterman | |
| 9,483,784 B2 | 11/2016 | Raney | |
| 9,519,682 B1 | 12/2016 | Pujara et al. | |
| 9,706,401 B2 | 7/2017 | Vincent et al. | |
| 10,149,156 B1 | 12/2018 | Tiku et al. | |
| 10,154,025 B2 | 12/2018 | Tinnakornsrisuphap et al. | |
| 10,218,695 B1 * | 2/2019 | Jain | H04L 63/102 |
| 10,445,732 B2 | 10/2019 | Oberheide et al. | |
| 10,535,086 B2 | 1/2020 | Raman | |
| 10,659,459 B1 | 5/2020 | Gadwale | |
| 10,958,774 B1 | 3/2021 | Harding | |
| 11,373,663 B2 | 6/2022 | Huber | |
| 11,587,056 B2 * | 2/2023 | Xiu | G06Q 20/403 |
| 2003/0110381 A1 | 6/2003 | Aoshima et al. | |
| 2004/0153414 A1 | 8/2004 | Khaishgi et al. | |
| 2006/0053296 A1 | 3/2006 | Busboom et al. | |
| 2008/0181379 A1 | 7/2008 | Chow et al. | |
| 2011/0149867 A1 | 6/2011 | Rudolf et al. | |
| 2011/0219427 A1 | 9/2011 | Hito et al. | |
| 2011/0270751 A1 | 11/2011 | Csinger et al. | |
| 2012/0198531 A1 | 8/2012 | Ort et al. | |
| 2012/0203708 A1 | 8/2012 | Psota et al. | |
| 2013/0144789 A1 * | 6/2013 | Aaltonen | G06Q 30/0239 |
| | | | 705/44 |
| 2013/0262857 A1 | 10/2013 | Neuman et al. | |
| 2014/0223516 A1 | 8/2014 | Vongsouvanh et al. | |
| 2014/0230039 A1 | 8/2014 | Prakash et al. | |
| 2014/0258032 A1 | 9/2014 | Psota et al. | |
| 2015/0073929 A1 | 3/2015 | Psota et al. | |
| 2015/0334108 A1 | 11/2015 | Khalil et al. | |
| 2016/0217464 A1 * | 7/2016 | Jajara | G06Q 20/322 |
| 2017/0068958 A1 | 3/2017 | Oberheide et al. | |
| 2017/0140134 A1 | 5/2017 | Brough et al. | |
| 2017/0142128 A1 * | 5/2017 | McCormack | H04L 63/108 |
| 2017/0250974 A1 | 8/2017 | Antonyraj et al. | |
| 2018/0034798 A1 | 2/2018 | Vincent et al. | |
| 2018/0041339 A1 | 2/2018 | Lee | |
| 2018/0253722 A1 * | 9/2018 | Gupta | G06Q 40/03 |
| 2018/0332042 A1 | 11/2018 | Yu et al. | |
| 2019/0074972 A1 | 3/2019 | Shastri et al. | |
| 2019/0228173 A1 * | 7/2019 | Gupta | G06F 21/6245 |
| 2019/0297075 A1 | 9/2019 | Kaladgi et al. | |
| 2019/0306158 A1 * | 10/2019 | Jain | H04L 63/108 |
| 2019/0312726 A1 * | 10/2019 | Sierra | H04L 63/104 |
| 2019/0327226 A1 | 10/2019 | Brown et al. | |
| 2019/0356672 A1 * | 11/2019 | Bondugula | H04L 63/205 |
| 2019/0386984 A1 | 12/2019 | Thakkar et al. | |
| 2020/0029268 A1 | 1/2020 | Russell et al. | |
| 2020/0104428 A1 | 4/2020 | Bier et al. | |
| 2020/0125247 A1 * | 4/2020 | Benkreira | G06F 3/04883 |
| 2020/0236113 A1 | 7/2020 | Monica et al. | |
| 2020/0372519 A1 * | 11/2020 | Repaka | G06F 16/9562 |
| 2020/0382510 A1 * | 12/2020 | Dunjic | H04L 63/102 |
| 2021/0073933 A1 | 3/2021 | Punnoose et al. | |
| 2021/0092227 A1 | 3/2021 | Naujok et al. | |
| 2021/0110500 A1 | 4/2021 | Nayudu et al. | |
| 2021/0144010 A1 * | 5/2021 | Tang | F41H 5/24 |
| 2021/0152689 A1 | 5/2021 | Gayaldo | |
| 2021/0201328 A1 | 7/2021 | Gunther | |
| 2021/0216658 A1 * | 7/2021 | Watson | G06F 21/6227 |
| 2021/0272560 A1 | 9/2021 | Trent, Jr. | |
| 2022/0229828 A1 | 7/2022 | Lawyer et al. | |
| 2022/0407702 A1 | 12/2022 | Jakobsson et al. | |
| 2023/0034169 A1 | 2/2023 | Ferenczi | |
| 2023/0067155 A1 | 3/2023 | Jackson et al. | |
| 2023/0241514 A1 | 8/2023 | Dalmia et al. | |
| 2023/0291570 A1 | 9/2023 | Doumar et al. | |
| 2024/0095720 A1 | 3/2024 | Binder et al. | |
| 2024/0127258 A1 | 4/2024 | Brannan et al. | |

OTHER PUBLICATIONS

Sina Rafati Niya, Deti: Decentralized Ticketing Management Platform, Jul. 2022, https://pmc.ncbi.nlm.nih.gov/articles/PMC9315850/pdf/10922_2022_Article_9675.pdf (Year: 2022).

* cited by examiner

940

902

942

DIGITAL SECURITY AND ACCESS CONTROL FOR CREDIT INFORMATION

TECHNICAL FIELD

The present disclosure is directed to methods and systems for improving security, digital control, and access to credit information.

BACKGROUND

Individuals and organizations today face increasingly complex and expansive cybersecurity threats. A user's sensitive information is often stored by a variety of businesses and organizations, the cybersecurity practices of which users have little to no control. This reality has led to a rise in people with malicious intent that attempt to steal sensitive information by compromising a data custodian's computer systems, and/or by engaging in social engineering to deceive people into volunteering information that is later used to authenticate a third party's access to sensitive information by an unsuspecting data custodian. With respect to credit information, users have limited means for controlling access to data such as credit reports and credit scores from credit bureaus. However, these credit bureaus have historically been the target of cybersecurity attacks, which have resulted in some of the largest data breaches in modern history. In effect, individuals—who are the victims of these financial crimes—have previously been unable to control the access to and distribution of sensitive information such as credit data.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
FIG. 1 is a block diagram illustrating an overview of devices on which some implementations can operate.
Figure 1:
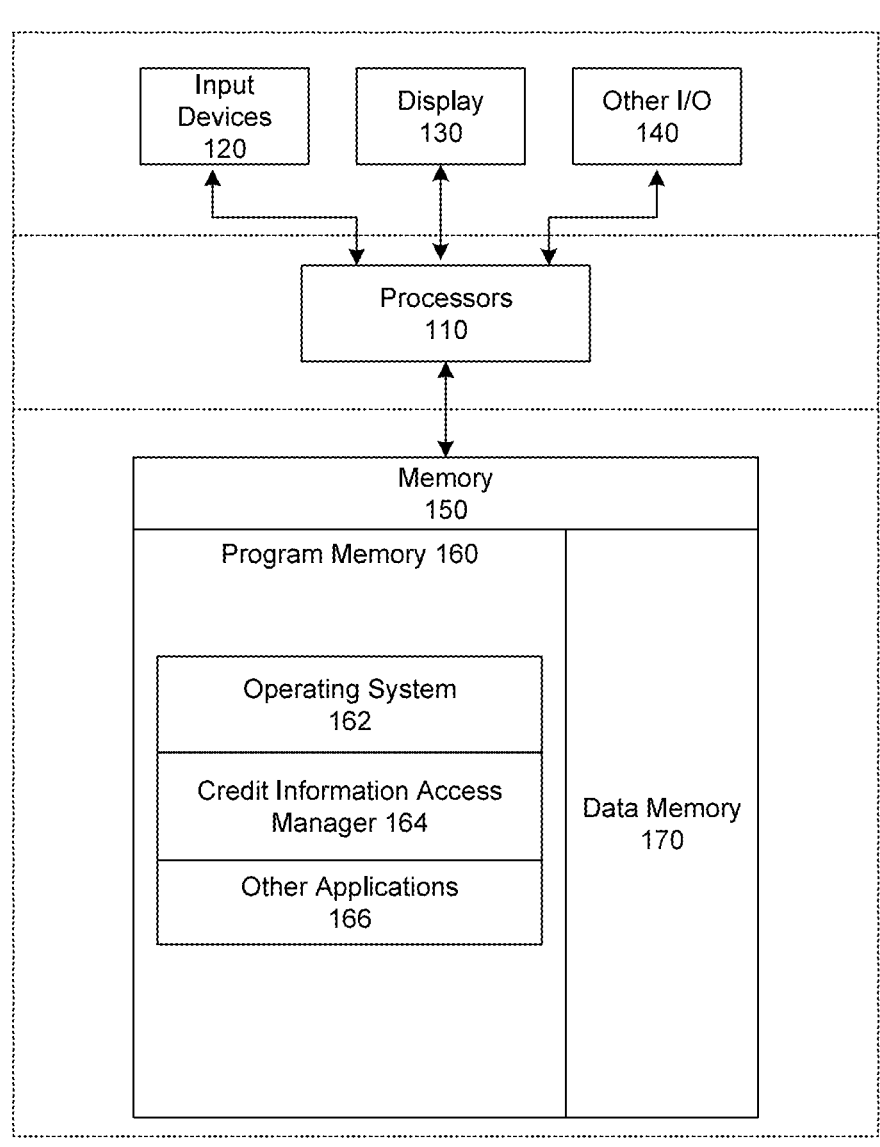

Aspects of the present disclosure are directed systems and methods for securing sensitive information by controlling access to and the distribution of the sensitive information using short-term third party authentication and automated third party deauthorization. For example, a trusted financial service provider may provide an access control and distribution system that connects with one or more credit information sources, such as credit bureau information systems. The system can authenticate users and third parties who wish to access credit information associated with those users (e.g., lenders, credit card companies, landlords, etc.). An authenticated user may grant to a third party limited access to their credit information, with the system restricting the contents of the credit information and/or the duration of the third party's access to the credit information. The third party's access to the user's credit information can be automatically revoked (e.g., after accessing the information, after a specified period of time has elapsed, and/or other condition(s) are met), such that the user's information is automatically secured. In this manner, the user's sensitive information is significantly less vulnerable to cybersecurity threats.

Historically, credit bureaus have authenticated individuals to access their credit information by asking a series of questions that only the authenticating person should know the answers to. Before the era of personal computers and smartphones, these questions were often delivered by credit bureau representatives over the phone. Today, this means of authentication is frequently delivered as prompts in a web application or mobile application. For instance, if a user wishes to provide credit information to a lender in an application for a loan that is maintained by a credit bureau, the user may be required to answer a series of questions in order to complete the application.

In most cases, the questions are presented with pre-selected multiple choice answers, with one of the provided answers being correct and the others being incorrect. One reason for providing multiple choice questions rather than a free-form answer (e.g., having the user input raw text) is that it is difficult to determine whether an answer is correct due to misspellings, typos, abbreviations, capitalization, and the fact that multiple words may be used to describe the same thing. For instance, questions may ask an applicant to provide a previous home address of a user, or to identify prior lenders that the user has received a line of credit from. Determining whether a user's entered answer is correct is a difficult task computationally, compared to determining whether the user selects the correct multiple choice answer.

In addition, authentication by these traditional methods may be achieved by answering a minimum threshold number of questions correctly, with the number of allowed incorrect answers being dependent on the security level of the lender. As a result, it is possible for a user's identity to be falsely authenticated by random or educated guessing, even if some of the questions are answered incorrectly. A nefarious third party can use social engineering or other means to gather some sensitive information about an individual sufficient to answer enough questions to falsely authenticate them as that individual.

Separate from these inherent vulnerabilities in the traditional authentication process for accessing an individual's credit information from a credit bureau, these credit bureaus have digital information systems that have been and continue to be vulnerable points of attack. There have been multiple significant data breaches of major credit bureaus in the past decade, most of which were a result of known vulnerabilities to data storage systems that were left unaddressed, which enabled people with malicious intent to exploit those vulnerabilities and access millions of users' sensitive information.

Nevertheless, these traditional authentication processes for credit information remain the dominant means for validating a person's identity when processing credit applications. Sometimes, the multiple choice questionnaire is embedded in a third party's website, making it possible for the third party to gather answers to the authentication questions, and increasing the danger from phishing attempts. While users might wish to access a copy of their own credit report and pass it along to third parties, third parties may be less likely to accept a user-provided credit report due to uncertainty over its authenticity (e.g., a user could fraudulently alter a report). In some jurisdictions, authentication using these traditional methods may be required by law or other applicable regulation. As a result, answering the security questions within a third party's web application remains the typical process of authentication.

Critically, when a user answers the security questions to authenticate themself and authorize a third party to access their credit information, the third party becomes an additional point of attack from which the user's sensitive information can be procured by unauthorized parties. For example, consider a user who authorizes a local car dealership to obtain their credit report as a part of a lease application. If a week later that car dealership's digital systems are compromised by a person with malicious intent, that person with malicious intent may be able to use the existing car dealership's authorization to gain access to the user's sensitive information from credit bureaus. If that authorization to the local car dealership is never revoked, this vulnerability may continue for months or years after the initial authorization was given. As a result, each authorized third party introduces additional vulnerabilities that increases a user's exposure to identity theft and other financial crimes.

Embodiments described herein overcome the problems of the traditional authentication process by providing a trusted intermediary that is situated between credit bureau information systems, individuals, and third parties who wish to access those individuals' credit information. The trusted intermediary can use a credit information access manager that stores account information and authenticates individuals and third parties. The credit information access manager can authenticate individuals using modern authentication practices, such as minimum password complexity, multi-factor authentication (MFA), and/or biometric authentication (e.g., fingerprint identification, facial identification, etc.), which might be required to gain access to application(s) on a client device or mobile device that interfaces with the credit information access manager (also referred to herein as the "user application"). An authenticated user may then authorize the trusted intermediary to access their credit information from one or more credit bureaus by answering the multiple choice security questions. The credit information access manager can dynamically access credit information from one or more credit bureaus (e.g., via an API).

The credit information access manager can provide tools to users that facilitate the extent to which one or more third parties can access a user's credit information. For example, a third party can create an account with the credit information access manager, which requires those third parties to use modern authentication practices such as MFA to access an application that interfaces with the credit information access manager (also referred to herein as the "accessor application"). A user may authorize that registered third party limited access to their credit information in the user application, which causes the credit information access manager to generate an identifier (e.g., a link, QR code, etc.) that grants that particular third party access to at least some of the user's credit information.

The credit information access manager can automatically deauthorize the identifier after a period of time, after the identifier is used by the third party to access the user's credit information, or after some other condition(s) is/are met. For instance, the credit information access manager can dynamically deauthorize one or more identifiers or lock out a third party accessor entirely based on repeated authentication failures, received reports of a cybersecurity breach of the third party, or extended inactivity by the third party accessor on the accessor application. The credit information access manager may implement a rules engine or the like that can be configured by the user to specify the condition(s) for deauthorizing identifiers. For example, the user may configure their account to have all identifiers deauthorize 5 minutes after they are generated by default. As another example, the user may specify to have identifiers be invalidated immediately after they are used once by the associated third party by default. The user may override these default settings when authorizing third parties to suit the particular scenario (e.g., authorize mortgage lender until closing date of a house purchase, which is longer than the default duration).

In some embodiments, the credit information access manager can maintain trust scores for each registered accessor, which can be algorithmically updated based on incident reports, user reviews, and/or user surveys. A user may configure their account to automatically prevent future authorization and/or to dynamically revoke existing authorizations of accessors whose trust scores fall below some threshold level.

The credit information access manager may execute one or more operations, services, applications, or the like periodically or otherwise to update the status of identifiers stored in the system. For example, a service may execute on a processor that retrieves stored identifiers that are considered valid at the time of execution. The service may retrieve information about the user and third party associated with each identifier, including any deauthorization rules specific to the user and/or the third party. By comparing one or more attributes of the identifier (e.g., issue date and time, number of uses, etc.) against the deauthorization rules associated with the identifier, the service can dynamically update the status of the identifier without requiring manual intervention. By dynamically updating the authorization status of third parties with respect to one or more users, the credit information access manager can enhance the security of the user's sensitive information and limit the risk of exposing the user's credit information to unauthorized parties. Unlike the traditional approach to authorizing third party access to a user's credit information, the credit information access manager automatically and dynamically deauthorizes third parties, thereby reducing the likelihood of the user's sensitive information being exposed if the third party is hacked.

In addition, because the credit information access manager is authorized to accesses credit information directly from credit bureaus, third parties do not need the user to answer security questions to obtain credit information from the credit bureaus. This reduces the number of parties that could potentially store the security questions and answers, as well as the number of parties that have authorization to directly access credit information from credit bureaus. In this manner-unlike the traditional approach to authorizing third party access to a user's credit information-if the third party's computer systems become compromised, the person with malicious intent would not be able to pose as that third party to the credit bureaus to obtain the user's sensitive information.

The credit information access manager can limit what aspects of the user's credit information are sent to various third parties. A user's credit information may include credit inquiries, credit card balances, loan balances, bankruptcy proceeding information, credit scores, risk classifications, employment information, and personal information (e.g., date of birth, social security number, etc.), among other information. Depending on the reason for the third party's access to a user's credit information, the third party may not need access to all the information contained in a comprehensive credit report. For instance, a small loan for a consumer good such as a smartphone may not need access to bankruptcy information or employment information. The credit information access manager may process credit information received from credit bureaus by generating a data structure of credit information applicable to the third party's inquiry. In this manner, the credit information access manager can moderate the extent of credit information shared with third parties for various inquiries, further limiting a user's exposure to sensitive information being stolen if a third party is hacked.

The credit information access manager may store a user's credit information in one or more standardized data structures. For instance, one standardized data structure may be used to package a subset of a user's credit information with respect to a particular type of credit information inquiry (e.g., a mortgage, car loan, credit card application, apartment rental application, etc.). The credit information access manager may invoke an application that is used to convert data received from one or more credit bureaus to populate one or more of the standardized data structures. In some implementations, the application can transform some of the information before it is stored in the data structure (e.g., extract the last four digits of a user's social security number and store only those last four digits).

Converting credit information into standardized data structures may further enable the user to specify one or more conditions that can be used to automatically classify third parties into one or more categories. For example, a credit card company category may not require information about legal proceedings or tax liens in order to process a credit card application. Therefore, an example standardized data structure for credit card applications may specifically omit information about legal proceedings and tax liens. In this manner, standardized data structures can be used to minimally satisfy a third parties' requirements without providing extraneous sensitive information.

In addition to controlling the authorization of third party accessors to access user credit information, the credit information access manager described herein may also facilitate control of the user's account status with one or more credit information sources. In some cases, a credit information source (e.g., a credit bureau) may provide digital tools to enable individuals or entities to lock or freeze their account, thereby preventing third parties from retrieving credit information (e.g., credit score, credit report, etc.) from their systems. The credit information access manager can interface with credit information sources and facilitate the freezing and unfreezing of user accounts with each of the credit information sources, either manually or dynamically. For example, the credit information access manager can provide tools in a user application to enable users to manually freeze and unfreeze their accounts with credit bureaus or other credit information sources. In some embodiments, the credit information access manager can dynamically freeze or unfreeze user accounts with credit information sources based on reported cybersecurity incidents, user reports about credit source behavior, user reviews of credit sources, automatically generated scores related to a credit information source's security practices, and/or other factors.

In some implementations, the credit information access manager can also control whether a given credit information source is used as a source of credit information for the purposes of generating credit data structures that may be provided to accessors. For instance, a user may block a particular credit source that is considered unreliable or inaccurate from serving as a source of credit information, without necessarily freezing their account from the credit source. In other words, that particular credit source may simply not be used in the credit distribution methods of the present disclosure, even though the user's account with that credit source remains unfrozen. Various implementations can provide granular controls in this regard, enabling users to specifically control whether a particular credit source can be used on an accessor-by-accessor basis, and/or on a per-inquiry basis (e.g., limiting which credit source(s) can be used in relation to a specific identifier generated in response to a specific inquiry).

Embodiments of the present disclosure address a key deficiency of existing credit information authorization systems by dynamically updating the permissions of each accessor without requiring human intervention. Human errors—such as failures to securely store sensitive user information, failures to keep cybersecurity systems up to date, and maintaining records of user authorizations for extended periods of time—are often the root cause of cybersecurity breaches. Using a secure, trusted intermediary to authenticate users, accessors, and delegates provides a more secure approach to identity verification compared to the traditional multiple-choice security question method. In addition, dynamically updating and automatically deauthorizing accessors without human intervention significantly reduces a user's exposure to identity theft. It would be virtually impossible to provide an analogous service to hundreds of millions of people without an automated, computerized approach to managing access control to a user's credit information.

As described herein, the term "credit information" generally refers to any data or information that is maintained, stored, updated, and/or provided by credit bureaus associated with individuals or entities in response to a credit inquiry. The contents of credit information may vary among different credit bureaus, different jurisdictions, and different users. Credit information may include personal information about the individual or entity (e.g., full name, address, date of birth, SSN, etc.), the individual or entity's lending history, the individual or entity's current and previous lines of credit (e.g., lender name, account type, payment history, delinquency status, etc.), details about legal proceedings related to the individual or entity's finances such as bankruptcy, credit scores and subscores, and other possible information.

With respect to controlling access to credit information, the term "user" generally refers to an individual or entity that is associated with credit information from one or more credit bureaus, while the terms "accessor" and "third party" generally refers to an individual or entity that accesses a user's credit information. It will be appreciated that both individuals or entities associated with credit information and those wishing to access others' credit information may both maintain accounts on a system implementing a credit information access manager, such that both types of parties can be users of applications interfacing with the credit information access manager. However, for the purposes of this disclosure, the term "user" more specifically refers to individuals or entities associated with credit information for which a credit information access manager dynamically controls access to with respect to third party accessors and/or delegates. Furthermore, the term "delegate" generally refers to an individual or entity that a user authorizes to grant other third party accessors access to the user's credit information.

Several implementations are discussed below in more detail in reference to the figures. FIG. 1 is a block diagram illustrating an overview of devices on which some implementations of the disclosed technology can operate. The devices can comprise hardware components of a device 100 that dynamically control access to and the distribution of credit information. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, credit information access manager 164, and other application programs 166. Memory 150 can also include data memory 170, e.g., account data, identifier data, credit information data sources, credit information data structures, permissions data, rules data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
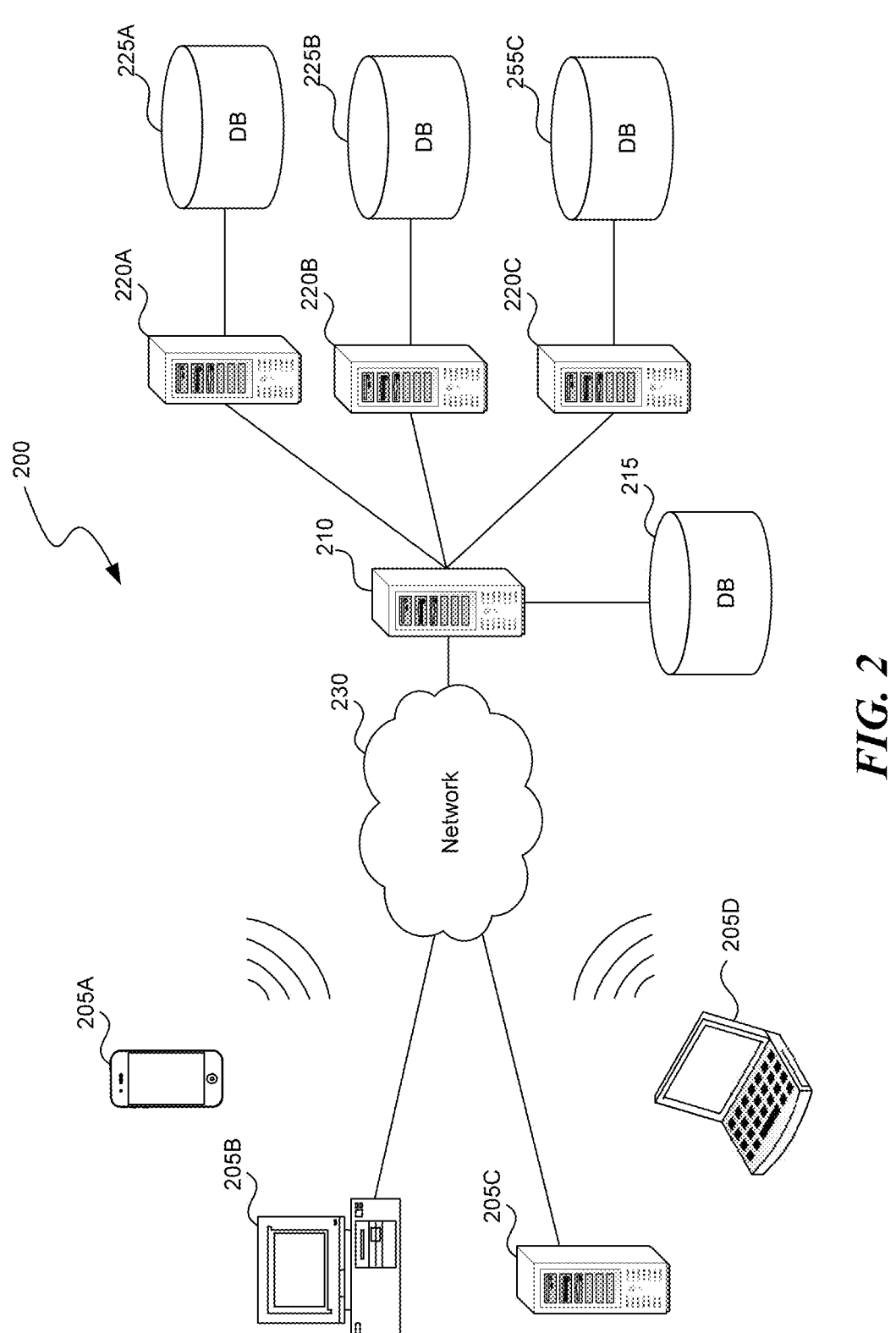
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as account data, identifier data, credit information data sources, credit information data structures, permissions data, and rules data, which may be on one or more databases for the credit information access manager 164. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
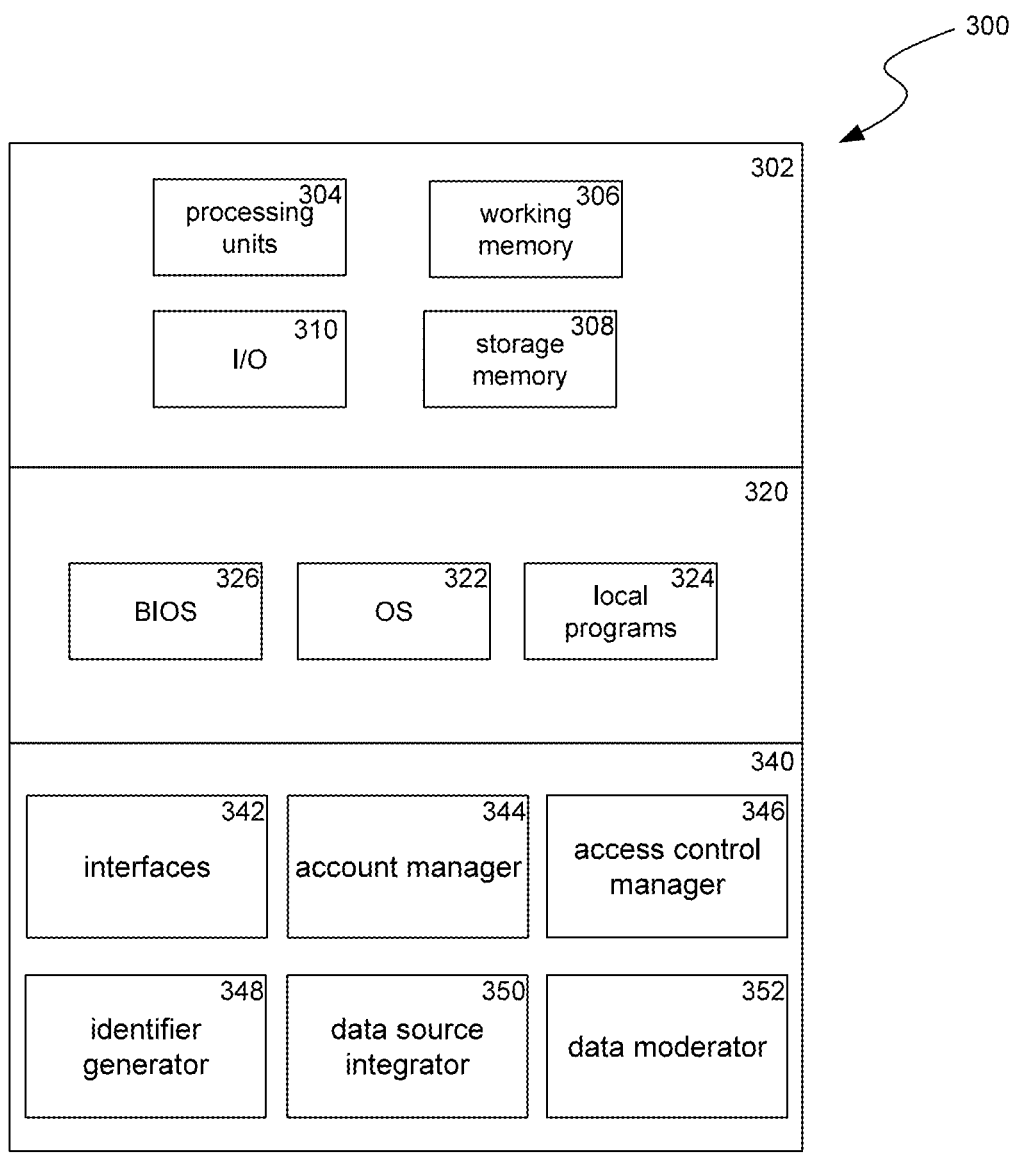
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include account manager 344, access control manager 346, identifier generator 348, data source integrator 350, data moderator 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Account manager 344 can store and update credentials, metadata, preferences, and other data associated with accounts for users, accessors, and/or delegates. For example, account manager 344 may store account data when a user, accessor, or delegate creates a new account with a credit information access manager (e.g., name, address, contact information, etc.). In addition, account manager 344 can facilitate the authentication of users, accessors, and/or delegates when they interface with the credit information access manager via an application. For instance, a user may be authenticated using some combination of a username and password, biometric verification (e.g., facial identification, fingerprint identification, etc.), MFA (e.g., an authentication code), and/or other means of authentication. In some cases, one or more authentication methods may be performed on a client device of a user, accessor, or delegate (e.g., biometric identification). Account manager 344 may authorize a user, accessor, or delegate to access their account on a credit information access manager, while access control manager 346 may handle authorizing specific requests from users, accessors, or delegates (e.g., an accessor requesting access to a user's credit information). Additional details on controlling access of third parties to credit information performed by account manager 344 are provided below in relation to account manager 612 of FIG. 6.

Access control manager 346 can facilitate the access of data retrieved from one or more data sources (e.g., credit bureau information systems) by various users, accessors, and/or delegates registered in account manager 344. In some implementations, access control manager 346 stores metadata associated with identifiers generated by identifier generator 348, such as the user associated with a credit information request, an accessor requesting the user's credit information, and conditions for deauthorizing the identifier such as an expiration date and time and/or number of permitted requests associated with the identifier. In other implementations, access control manager 346 may store permission metadata that is similar to the identifier metadata described above, which may be used to authorize particular requests for credit information with or without an identifier.

Access control manager 346 can determine whether to authorize a request for a user's credit information by an accessor. As an example, access control manager 346 receives a request to access a user's credit information from an accessor that includes a previously-generated identifier. Access control manager 346 may determine whether the identifier is associated with the accessor's account and deny the request if the identifier is not associated with the accessor (or if the accessor is not properly authenticated to use the credit information access manager). Access control manager 346 can then determine whether the identifier is valid. For example, if the identifier has an expiration date and time, access control manager 346 may compare the date and time of the request against that expiration date and time to determine If the identifier is expired. As another example, if the identifier has already been used in a prior request and is configured for a single use, access control manager 346 may deny the accessor's request for credit information. In some implementations, an identifier's validity may be periodically updated by access control manager 346, with the identifier's validity status serving as the basis for allowing or denying an accessor's access to a user's credit information.

Access control manager 346 may also interface with data moderator 352 to limit the extent to which a user's credit information is shared with an accessor for a particular request. In some embodiments, data moderator 352 converts data received from data sources into one or more standardized data structures, each providing a different level of detail of a user's credit information. For instance, a particular data structure may redact or otherwise limit sensitive information that is considered irrelevant or unnecessary to certain inquiries for credit information (e.g., replacing full account numbers with only a subset of an account number's digits, obscuring specific account names or lenders, reducing the number of significant figures of account balances, replacing specific dates with only the month or year, etc.). Access control manager 346 can determine the appropriate level of detail for a specific request for a user's credit information (e.g., based on request metadata like the size of a loan and/or the purpose of the inquiry), and accordingly retrieve the user's credit information in a data structure corresponding to the determined level of detail to satisfy the request. In this manner, access control manager 346 may moderate the extent to which sensitive information is shared with third party accessors. Additional details on account management and authentication of users, accessors, and delegates performed by access control manager 346 are provided below in relation to blocks 410-414 of FIG. 4, blocks 512-516 of FIG. 5, access control manager 614 of FIG. 6, steps 718 and 728 of FIG. 7A, steps 738 and 744 of FIG. 7B, and steps 824 and 834 of FIG. 8.

Identifier generator 348 can generate identifiers in response to specific requests by users to grant an accessor access to the user's credit information. An identifier may be any link, QR code, barcode, passcode, hash code, or other unique identifier that is used to authorize third party access to a user's credit information. For example, identifier generator 348 may generate a universal resource indicator (URI) with a unique string parameter that invokes an API call, which triggers an authentication process by access control manager 346. The URI may be sent to an accessor's email address, sent as an SMS message, or appear as an interactive UI element in an accessor's application that interfaces with the credit information access manager 164 (e.g., button 926 shown in FIG. 9C).

As another example, identifier generator 348 can generate a matrix barcode that encodes a unique identifier or a URI with an embedded unique identifier which is used to authorize third party access to a user's credit information. In situations where the user and accessor are collocated (e.g., a user visiting a car dealership in person), the matrix barcode may be sent to and displayed on the user's device so that the accessor can scan the matrix barcode from the user's device to authorize their access to the user's credit information. In other scenarios, the matrix barcode may be sent to a secure email address or rendered as a UI element in an accessor application, which can in turn be scanned by another client device of the accessor to facilitate the authentication. In situations where a user has given a third party delegate permission to authorize credit information requests by other accessors, the matrix barcode code may be displayed on a delegate's device for scanning by another third party accessor.

Identifier generator 348 can generate metadata associated with the identifier, such as the creation date and time, a reference to an associated user account, a reference to an associated third party account, and conditions or parameters that dictate how and/or when the identifier is deauthorized. Identifier generator 348 may interface with account manager 344 to obtain user preferences indicative of default identifier deauthorization settings, which may or may not be overridden by a specific request's deauthorization conditions. Additional details on identifiers and their creation by identifier generator 348 are provided below in relation to block 404 of FIG. 4, block 508 of FIG. 5, identifier generator of FIG. 6, step 712 of FIG. 7A, step 734 of FIG. 7B, and step 818 of FIG. 8.

Data source integrator 350 can interface with one or more credit bureau information systems to obtain credit information of users registered in account manager 344. For example, data source integrator 350 can invoke API calls, perform web scraping, perform optical character recognition (OCR) on document files, and/or otherwise retrieve credit information from one or more credit bureaus. Data source integrator 350 may include data acquisition and conversion utilities specific to each credit bureau information system.

In some embodiments, data source integrator 350 can control whether a user's respective accounts with one or more of the credit information sources is locked or frozen. For example, data source integrator 350 may make an API call to a particular data source that instructs that data source to freeze the user's account (e.g., to prevent that data source from providing credit information in response to other API calls to retrieve credit information from that data source). As another example, the data source manager 350 can access a website for a particular data source (such as a credit bureau that does not provide API controls) and can run an automated script defined for that credit bureau's website configured to freeze or unfreeze the user's account on that credit bureau. Likewise, data source integrator 350 can unlock or unfreeze a frozen account with each data source. In some implementations, data source integrator 350 may interface with access control manager 614 to inform access control manager 614 of whether a given data source is frozen and/or whether a given data source is restricted from being used with a particular accessor and/or with a particular identifier.

The format and contents of credit information from different credit bureaus may vary. Data source integrator 350 can interface with data moderator 352 to convert unstructured or non-standardized data from credit bureaus into standardized data structures, which may be used to render UI elements in user and accessor applications, stored in storage memory 308, and/or transmitted to accessors. Additional details on retrieving credit information by data source integrator 350 are provided below in relation to block 414 of FIG. 4, block 516 of FIG. 5, data source integrator 618 of FIG. 6, steps 720 and 722 of FIG. 7A, and steps 826 and 828 of FIG. 8.

Data moderator 352 can generate standardized data structures containing transformed credit information received from credit bureau information systems via data source integrator 350. Each data structure can have metadata indicating its type, level of detail (e.g., no personally identifiable information, partially redacted sensitive information, included portions, omitted portions, etc.), and/or associated type of request. In some implementations, a request for credit information can include a purpose for the request (e.g., rental application, mortgage application, credit card application, etc.), a monetary value (e.g., amount of credit requested, monthly payment amount, etc.), and/or the type of entity the accessor is (e.g., a bank, a credit card company, a landlord, etc.). A given data structure may be considered satisfactory to fulfill a request for a particular purpose, monetary value, and/or type of accessor. Additional details on standardizing and moderating data using data structures by data moderator 352 are provided below in relation to block 414 of FIG. 4, block 516 of FIG. 5, data moderator 620 of FIG. 6, step 724 of FIG. 7A, and step 830 of FIG. 8.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
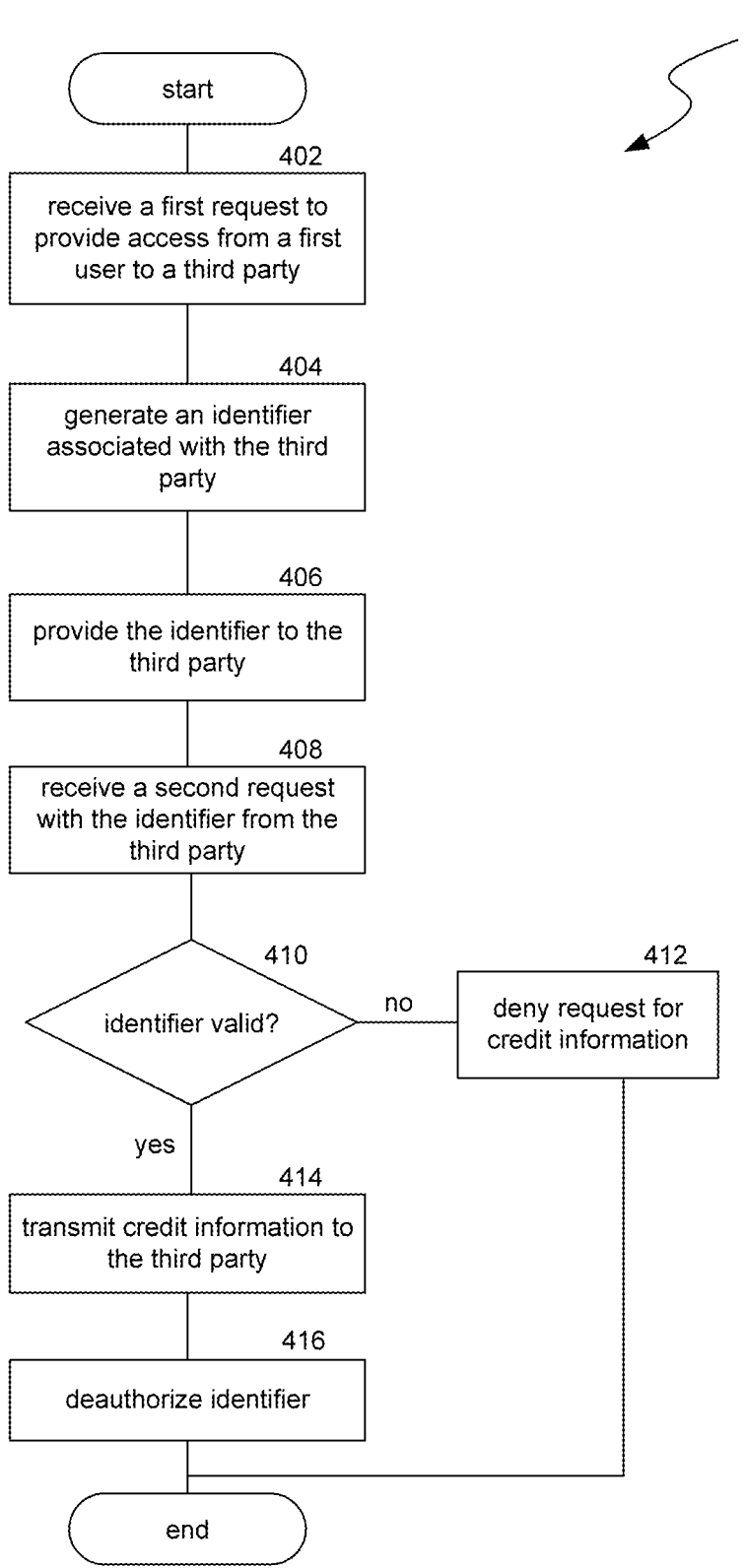
FIG. 4 is a flow diagram illustrating a process used in some implementations for providing limited access to a user's credit information.

FIG. 4 is a flow diagram illustrating a process 400 used in some implementations for providing limited access to a user's credit information, some or all of which may be performed by credit information access manager 164, credit information access manager 610, distribution manager 706, distribution manager 808, and/or other implementations of the present disclosure's digital credit information access control systems. Operations described with respect to process 400 can be performed by one or more servers (e.g., cloud servers) that communicate with one or more client devices to facilitate user authentication the distribution of credit information. Process 400 may begin when a user initiates an authorization process in a user application that interfaces with a credit information access manager. For the sake of brevity, operations of process 400 are described as being performed by credit information access manager 164.

At block 402, process 400 receives a first request from a first user to provide access to the first user's credit information to a third party. The first request may be an invocation of an API call (e.g., the first user interacting with a UI element in a user application such as a button), which instructs process 400 to perform operations to authorize the third party access to the user's credit information. The first request can include metadata such as a user account identifier, which may be used to obtain and/or store additional metadata in association with a generated identifier.

At block 404, process 400 generates an identifier associated with the third party in response to the request. The process 400 can generate a unique string, hash code, URI, matrix barcode, or the like, along with metadata related to the user and the third party. The identifier and its metadata can be stored by process 400 and subsequently used to determine whether to authorize the third party's access to the user's credit information.

At block 406, process 400 provides the identifier to the third party. In some cases, the process 400 sends the identifier to the user (e.g., via an email, SMS message, or in a user application) to enable the user to share the identifier with the third party in person. For example, an accessor application may prompt the third party to scan a generated QR code identifier before authorizing the third party access to the user's credit information, such that the user's presence (and authenticated access to a user application) is required to complete the third party's authorization to access the user's credit information. In other cases, the process 400 sends the identifier to the third party directly (e.g., as a link or interactable UI element in an accessor application), such that the third party can access the user's credit information without the user's physical presence.

At block 408, process 400 receives a second request with the identifier from the third party. The second request may be an invocation of another API call (e.g., the third party interacting with a UI element in an accessor application such as a button), for example. In some implementations, the third party may transmit the second request to process 400 by clicking a button or link with an embedded parameter containing the identifier. In other implementations, an accessor application may require a third party to separately enter or scan the identifier, which in turn is transmitted as a data payload or parameter with the API call.

At block 410, process 400 determines whether the identifier is valid. In some implementations, process 400 may determine if the identifier is associated with the user and the third party by retrieving identifier metadata and comparing it with the contents of the request, and/or by generating a hash code to cryptographically verify that the identifier is associated with the user and the third party. In addition, process 400 can evaluate the validity of the identifier against one or more deauthorization conditions, such as an expiration date and time, whether a maximum number of invocations has been exceeded, and/or whether the third party's account has been recently associated with cybersecurity incidents or fraud. Process 400 can dynamically update the expiration conditions without explicit action by the user, such that the identifiers can be automatically deauthorized after one or more conditions are met. In some cases, the user may manually revoke the authorization associated with the identifier, with an indication of the revocation being stored as metadata in association with the identifier.

If process 400 determines that the identifier is no longer valid, process 400 proceeds to block 412. At block 412, process 400 denies the second request for credit information. In some cases, the process 400 may notify the third party and/or the user of the denial and store a record of the invalid request for reference. Depending upon the particular implementation, the process 400 may or may not explain which condition or conditions resulted in the identifier being deemed invalid. The process 400 may update the identifier's metadata upon determining that it is invalid (e.g., flag it as invalid), and/or may migrate the identifier to a different table or database (e.g., from a valid identifiers database to an expired identifiers database).

If process 400 determines that the identifier is valid, process 400 proceeds to block 414. At block 414, process 400 transmits credit information to the third party. In some cases, credit information from a credit bureau may be converted into a standardized data structure before it is sent to the third party, such that the process 400 can limit the contents of the credit information. In some implementations, the process 400 may make the credit information available for viewing as read-only data in an accessor application that interfaces with the credit information access manager 164, while restricting the third party from storing their own copy of the user's credit information. In this manner, the process 400 may mitigate the potential for copies of sensitive information being stored on untrusted third party systems. In some embodiments, the retrieval of credit information from a credit information source may be restricted due to the user's account with that credit source being locked, frozen, or specifically restricted with respect to the third party and/or with respect to the request associated with the identifier.

At block 416, process 400 deauthorizes the previously-generated identifier. The process 400 can automatically deauthorize the identifier after it is used to fulfill the second request (e.g., a one-time use identifier). The process 400 can alternatively or additionally dynamically deauthorize the identifier after deauthorization conditions are met, such as the current date and time being after a designated expiration date and time for the identifier. Process 400 can perform identifier deauthorization without intervention by users with a variety of different conditions specific to each user and/or each request, enabling each user to have greater control over the distribution of sensitive information.

Figure 5:
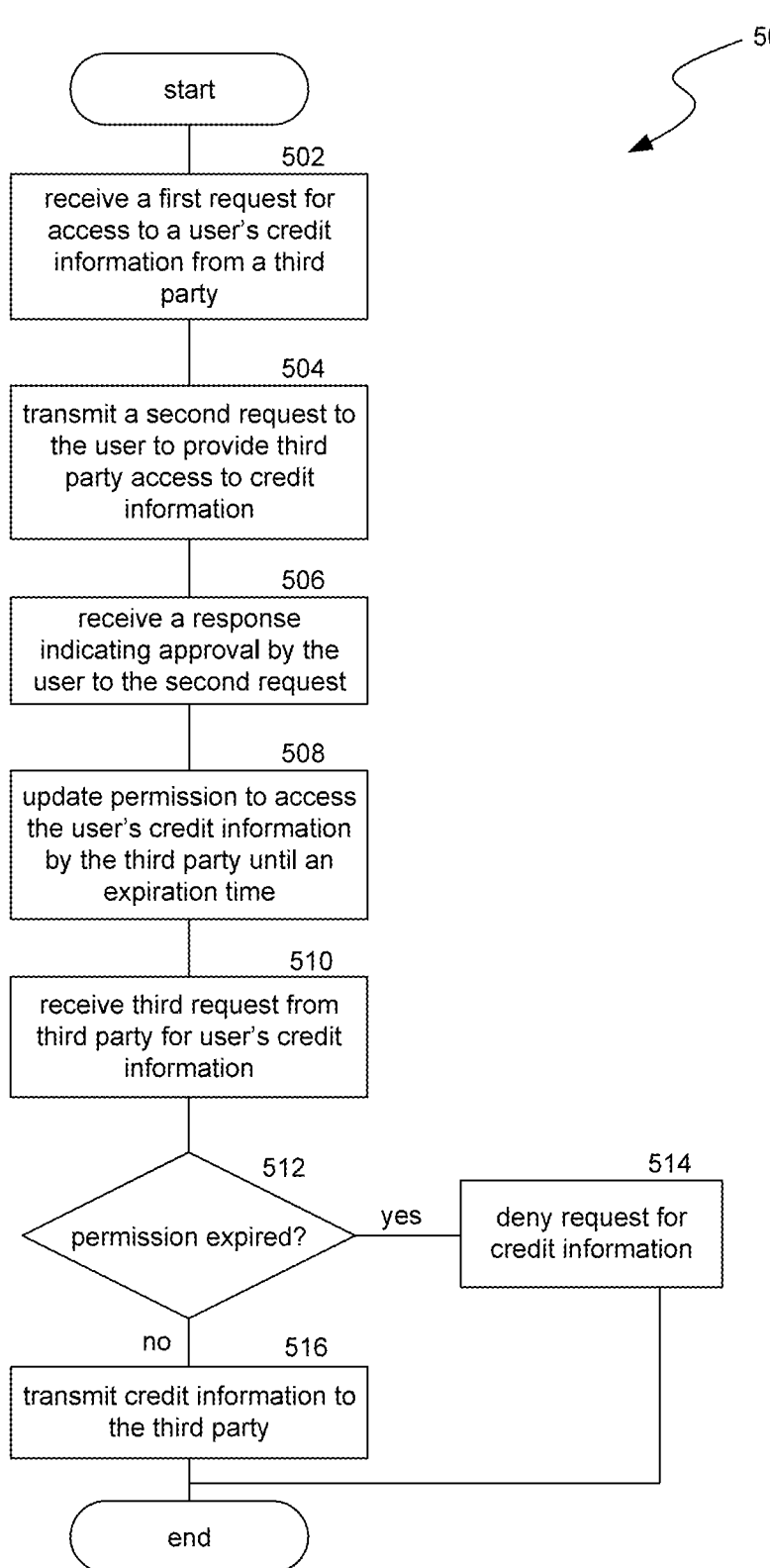
FIG. 5 is a flow diagram illustrating a process used in some implementations for automatically deauthorizing a third party's access to a user's credit information.

FIG. 5 is a flow diagram illustrating a process 500 used in some implementations for automatically deauthorizing a third party's access to a user's credit information, some or all of which may be performed by credit information access manager 164, credit information access manager 610, distribution manager 706, distribution manager 808, and/or other implementations of the present disclosure's digital credit information access control systems. Operations described with respect to process 500 can be performed by one or more servers (e.g., cloud servers) that communicate with one or more client devices to facilitate dynamically adjusting third party access to a user's credit information. Process 500 may begin when a third party initiates an authorization process in an accessor application that interfaces with a credit information access manager. For the sake of brevity, operations of process 500 are described as being performed by credit information access manager 164.

At block 502, process 500 receives a first request from a third party to provide access to a user's credit information. The first request may be an invocation of an API call (e.g., the third party interacting with a UI element in an accessor application such as a button), which instructs process 500 to prompt the user to grant the third party access to the user's credit information.

At block 504, process 500 transmits a second request to the user to provide third party access to credit information. The second request may cause a user to be notified (e.g., in a user application, via email, or via SMS) that the third party wishes to get access to the user's credit information.

At block 506, process 500 receives a response from the user indicating the user's approval to provide access to their credit information. The response from the user may be similar to the first request of block 402, with the response invoking an API call that instructs the process 500 to perform operations to authorize the third party access to the user's credit information. The response can include metadata such as a user account identifier, which may be used to obtain and/or store additional metadata in association with a generated identifier.

At block 508, process 500 updates permission metadata that controls the third party's access to the user's credit information by automatically setting an expiration date and time. In some embodiments, the process 500 generates an identifier that serves as a token for a limited authorization of the third party to access the user's credit information. In other embodiments, the process 500 updates or creates a record in a database indicating that the third party has permission to access the user's credit information. The record may include data such as deauthorization conditions to enable the credit information access manager 164 to automatically revoke the authorization after one or more conditions are met.

At block 510, process 500 receives a third request from the third party for the user's credit information. The third request may embed an identifier as described above, and/or may include an authorization token used to authenticate that the request was made by the third party.

At block 512, process 500 determines whether the third party's permission to access the user's credit information is expired. For instance, process 500 can evaluate a particular authorization of the third party to access the user's credit information against deauthorization condition(s). For example, if process 500 set the permission to automatically expire at a set date and time, and the third request at block 510 occurs after that expiration date and time, then process 500 deems the permission expired and transitions to block 514. Alternatively, if the third request at block 510 occurs before the expiration date and time, then process 500 deems the permission valid and transitions to block 516. At block 514, process 500 denies the request for credit information, which may be similar to or the same as block 412. At block 516, process 500 transmits credit information to the third party, which may be similar to or the same as block 414.

Figure 6:
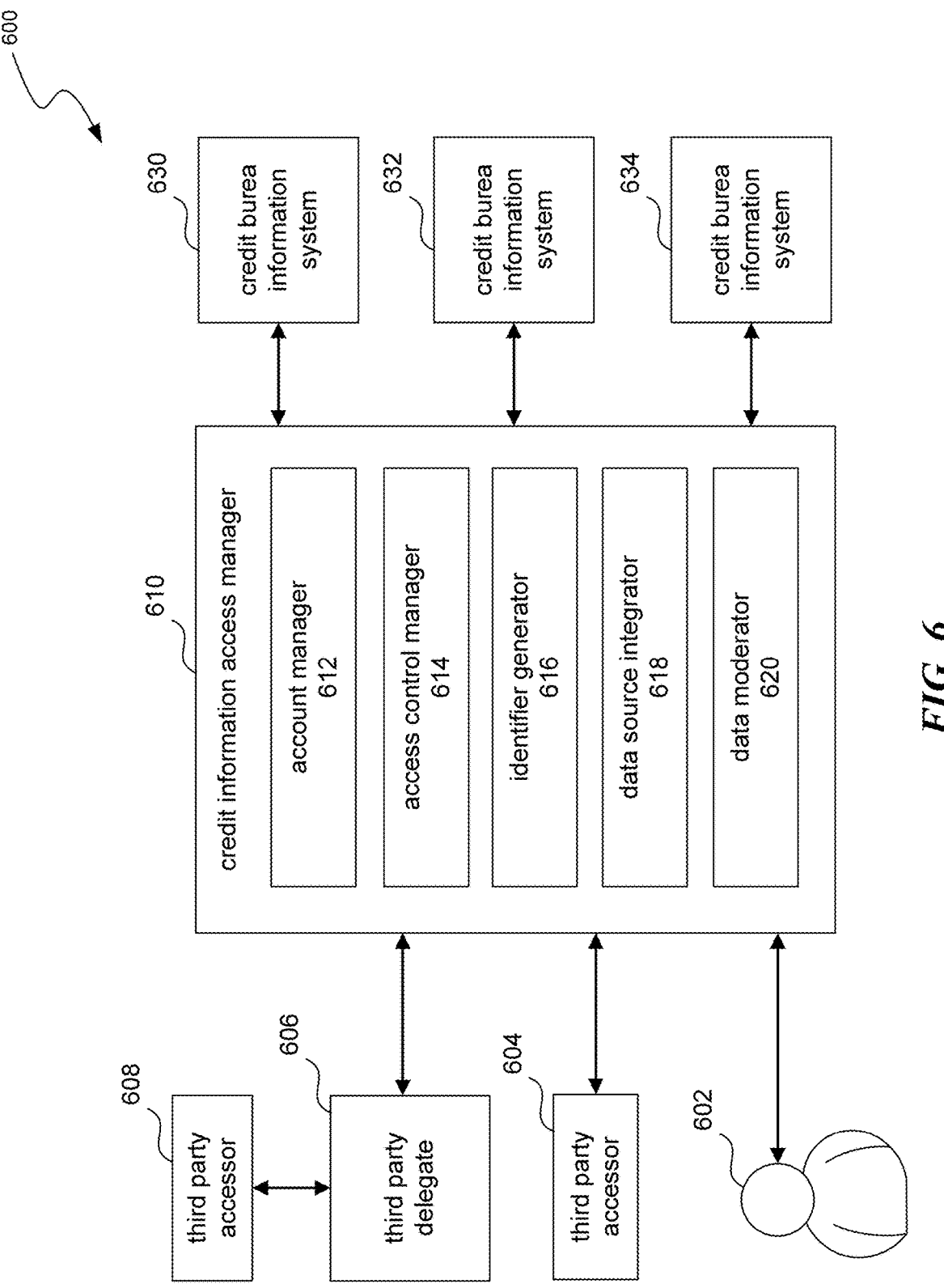
FIG. 6 is a conceptual diagram illustrating an example system for controlling the distribution of credit information to third party accessors.

FIG. 6 is a conceptual diagram 600 illustrating an example system for controlling the distribution of credit information to third party accessors. The system includes credit information access manager 610, which may be similar to or the same as credit information access manager 164. Credit information access manager 610 acts as a trusted intermediary between credit bureau information systems 630-634 and various account holders, such as user 602, third party accessors 604 and 608, and third party delegate 606. In this example, account manager 612 may be similar to or the same as account manager 344, access control manager 614 may be similar to or the same as access control manager 346, identifier generator 616 may be similar to or the same as identifier generator 348, data source integrator 618 may be similar to or the same as data source integrator 350, and data moderator 620 may be similar to or the same as data moderator 352.

As illustrated in FIG. 6, user 602 does not directly interface with third party accessors 604 and 608, and third party accessors 604 and 608 do not directly interface with credit bureau information systems 630-634. Instead, credit information access manager 610 facilitates the transfer of credit information from credit bureau information systems 630-634 to third party accessors 604 and 608 only when user 602 provides authenticated authorization of said transfer. In this manner, credit information access manager 610 improves upon previous credit information access systems in which users provided sensitive information to untrusted third party accessors.

In some embodiments, user 602 may permit third party delegate 606 to authorize other third party accessors, such as third party accessor 608, to access the user's credit information on their behalf. For instance, a parent or guardian may wish to grant third party accessors limited access to their child's credit information. As another example, a person may elect to have their agent be a delegate (e.g., a real estate agent, lawyer, or other trusted third party). User 602 may specify constraints with which third party delegate 606 is permitted to authorize third party accessors access to their credit information, which may be stored in account manager 612. For example, third party delegate 606 may be permitted to only authorize third party accessors of a particular category or classification. In addition, third party delegate may be constrained to authorize third party accessors for a maximum period of time (e.g., can only authorize accessors for up to 10 minutes), to a maximum level of detail (e.g., cannot send any non-redacted personal information such as the user's SSN or exact date of birth), and/or a maximum number of authorizations (e.g., approved for no more than 5 authorizations). Furthermore, access control manager 614 can automatically deauthorize third party delegate's 606 authorization after one or more conditions are met, such as an expiration date and time.

Although not illustrated in FIG. 6, third party accessor 608 may directly interface with credit information access manager 610 (e.g., via an accessor application). In some implementations, third party accessor 608 can create an account with credit information access manager 610, and receive credit information via requests to credit information access manager 610 with authorization given by third party delegate 606. Third party accessor 608 is shown to access credit information access manager 610 via third party delegate 606 to illustrate that third party delegate 606 controls the extent of third party accessor's 608 access to user's 602 credit information.

Figure 7A:
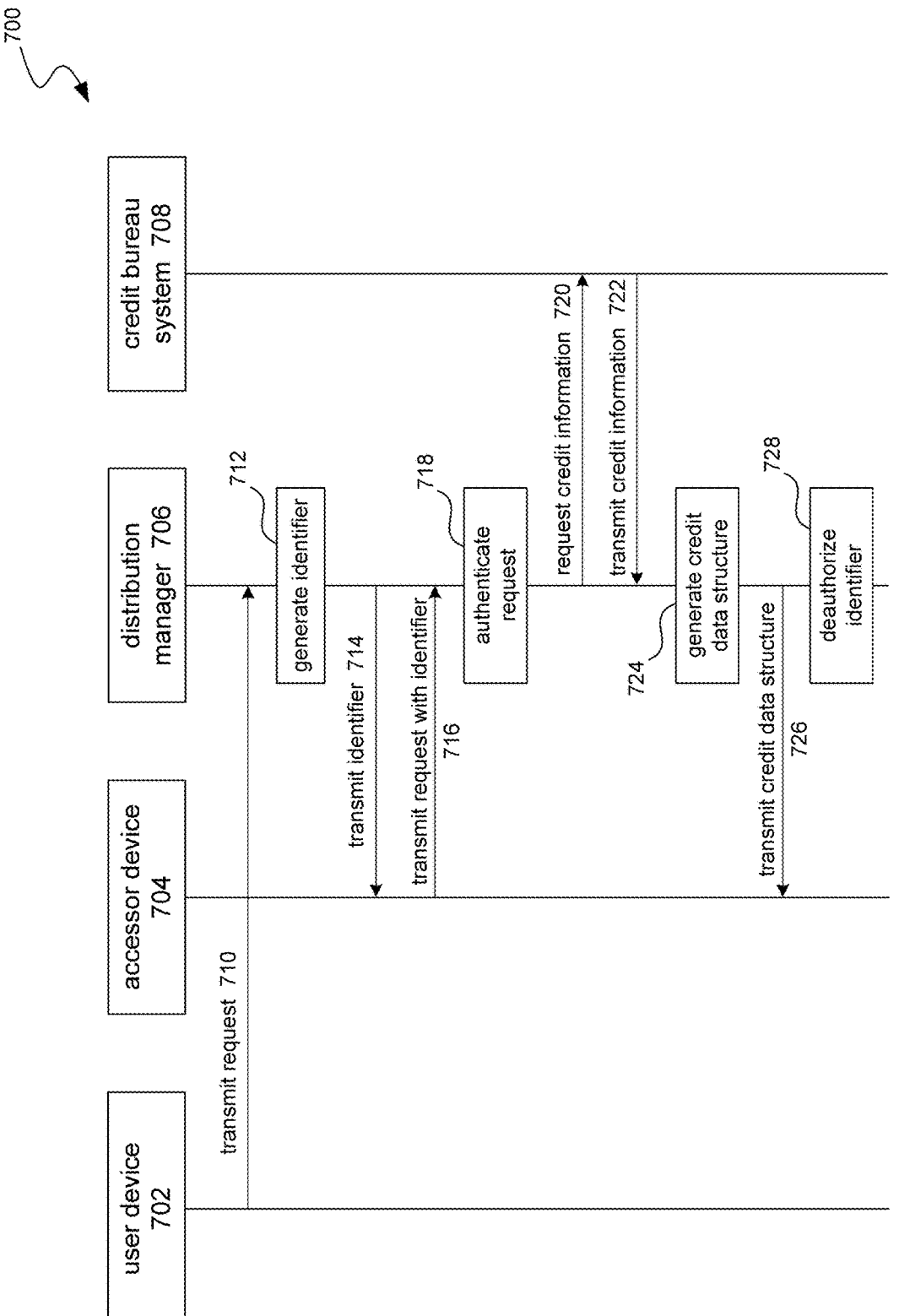
FIG. 7A is a sequence diagram of operations performed by devices for authorizing the transmission of credit information to a third party accessor.
Figure 7B:
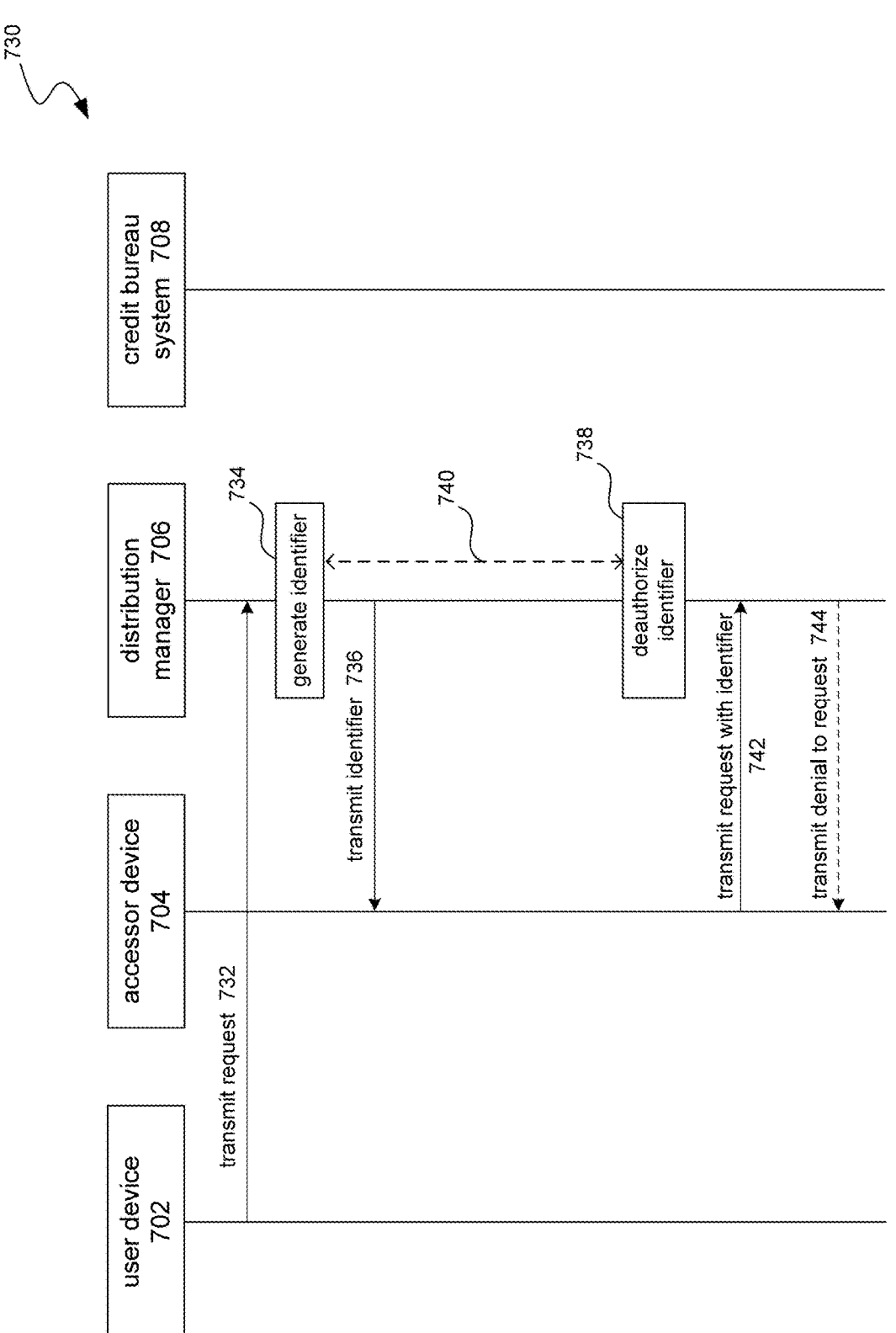
FIG. 7B is a sequence diagram of operations performed by devices for denying the transmission of credit information to a third party accessor.

FIGS. 7A and 7B illustrate sequence diagrams of operations performed by user device 702, accessor device 704, distribution manager 706, and credit bureau system 708. The user device 702 may be a client device (e.g., client computing devices 205A-D) of a user, such as user 602. The accessor device 704 may be any client device associated with a third party accessor, such as third party accessor 604 or 608. The distribution manager 706 may be similar to or the same as the credit information access manager 164 or the credit information access manager 610. The credit bureau system 708 may be similar one of the credit bureau information systems 630-634.

FIG. 7A is a sequence diagram 700 of example operations for authorizing the transmission of credit information to a third party accessor. The sequence begins at step 710 when user device 702 transmits a request to distribution manager 706 to authorize a third party accessor access to their credit information. The distribution manager 706 generates an identifier at step 712, which is transmitted to the accessor device 704 at step 714. The accessor device 704 then transmits a request to access the user's credit information with the received identifier at step 716. At step 718, the distribution manager 706 authenticates the request by determining that the identifier is valid and associated with the third party accessor of accessor device 704.

At step 720, the distribution manager 706 transmits a request for the user's credit information to credit bureau system 708. In response, credit bureau system 708 transmits the user's credit information to distribution manager 706 at step 722. Distribution manager 706 then generates a credit data structure at step 724, such as according to a standardized data structure as described above with respect to data moderator 352. At step 726, distribution manager 706 transmits the credit data structure to accessor device 704. Once the transmission is complete, distribution manager 706 automatically deauthorizes the identifier at step 728. In this example, a one-time use identifier is used to prevent accessor device 704 from gaining access to the user's credit information for an extended period of time, as is common with existing approaches for providing third parties with access to credit information.

FIG. 7B is a sequence diagram 730 of operations for denying the transmission of credit information to a third party accessor. In this example, a third party accessor fails to request access to the user's credit information before the identifier is automatically deauthorized. The sequence begins at step 732 when user device 702 transmits a request to distribution manager 706 to authorize a third party accessor access to their credit information. The distribution manager 706 generates an identifier at step 734, which is transmitted to the accessor device 704 at step 736.

In this example, distribution manager 706 generates the identifier which is only valid within a period of time 740. Thus, after the period of time 740 has elapsed, distribution manager 706 automatically deauthorizes the identifier at step 738. Subsequently, when accessor device 704 attempts to request access to the user's credit information with the identifier at step 742, distribution manager 706 denies the request because the identifier was deauthorized prior to step 742. In some implementations, distribution manager 706 transmits a denial to the request to accessor device 704 at step 744, which may inform the third party accessor that the request was denied because the identifier has expired.

Figure 8:
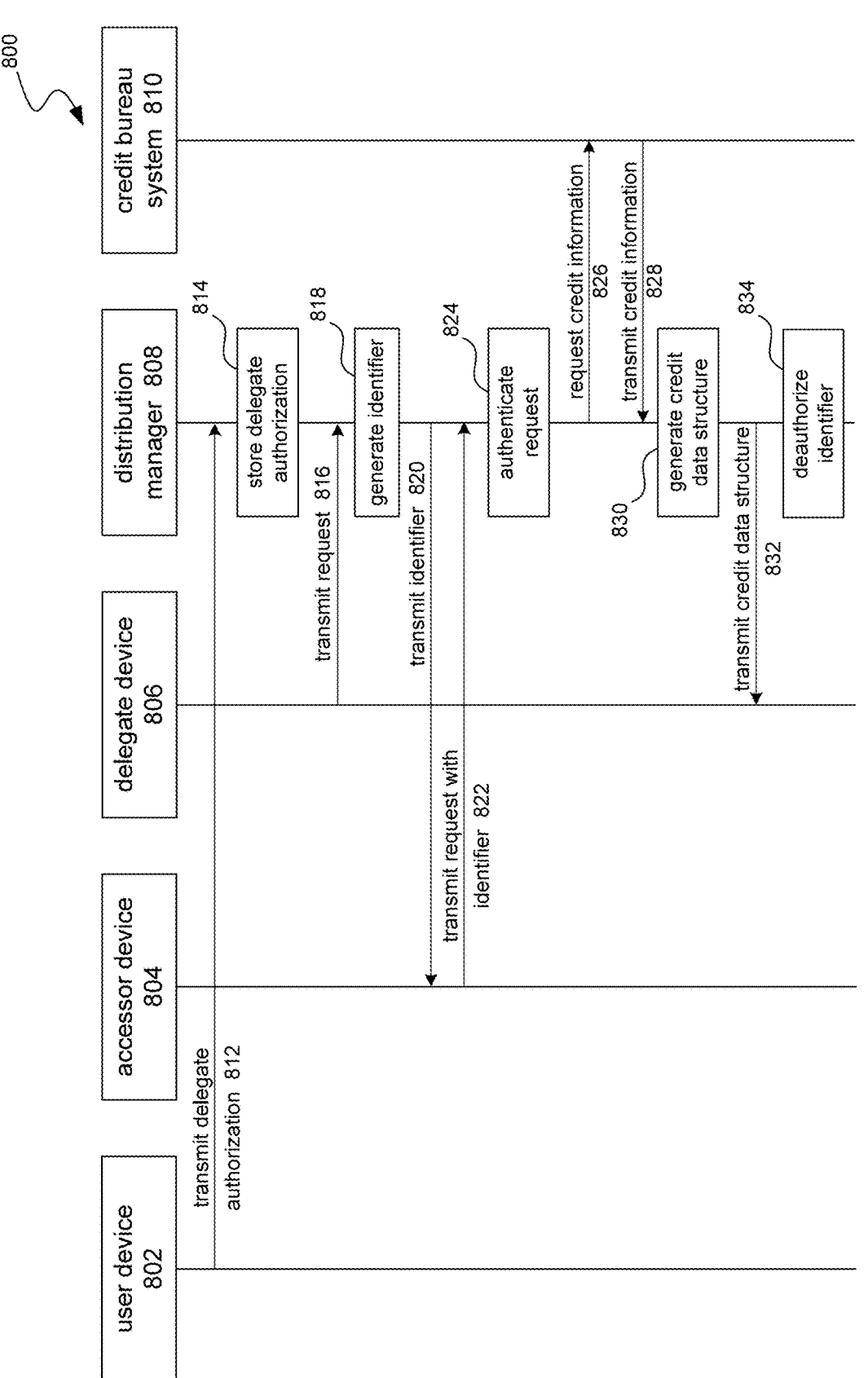
FIG. 8 is a sequence diagram of operations performed by devices for authorizing a third party delegate to grant a third party accessor access to credit information.

FIG. 8 is a sequence diagram of operations performed by user device 802, accessor device 804, delegate device 806, distribution manager 808, and credit bureau system 810 for authorizing a third party delegate to grant a third party accessor access to credit information. The user device 802 may be a client device (e.g., client computing devices 205A-D) of a user, such as user 602. The accessor device 804 may be any client device associated with a third party accessor, such as third party accessor 604 or 608. The delegate device 806 may be a client device associated with a third party delegate, such as third party delegate 606. The distribution manager 808 may be similar to or the same as the credit information access manager 164 or the credit information access manager 610. The credit bureau system 810 may be similar one of the credit bureau information systems 630-634.

In this example, a user authorizes a delegate to grant other third party accessors access to their credit information. The sequence begins at step 812 when user device 802 transmits a request to authorize a delegate to distribution manager 808. Distribution manager 814 processes the request at step 814, stores the delegate authorization, and accordingly updates the account data. After the delegate authorization has been processed, delegate device 806 transmits a request to distribution manager 808 to authorize a third party accessor to access the user's credit information. In response, distribution manager 808 generates an identifier at step 818 and transmits that identifier to accessor device 804 at step 820.

At step 822, accessor device 804 transmits a request with the received identifier to distribution manager 808. Upon receipt of the request from accessor device, distribution manager 808 determines that accessor device 804 is authenticated and that the identifier is valid, and in turn authenticates the request at step 824. Then, distribution manager 808 requests credit information associated with the user from credit bureau 810 at step 826, which responds with the user's credit information at step 828.

At step 830, the distribution manager 808 processes the received credit information and generates a credit data structure, such as according to a standardized data structure as described above with respect to data moderator 352. At step 832, distribution manager 808 transmits the credit data structure to accessor device 804. After the transmission is complete, distribution manager 808 automatically deauthorizes the identifier at step 834 (e.g., due to time-based expiration, due to one-time use expiration, and/or because other deauthorization condition(s) is/are met).

Figure 9A:
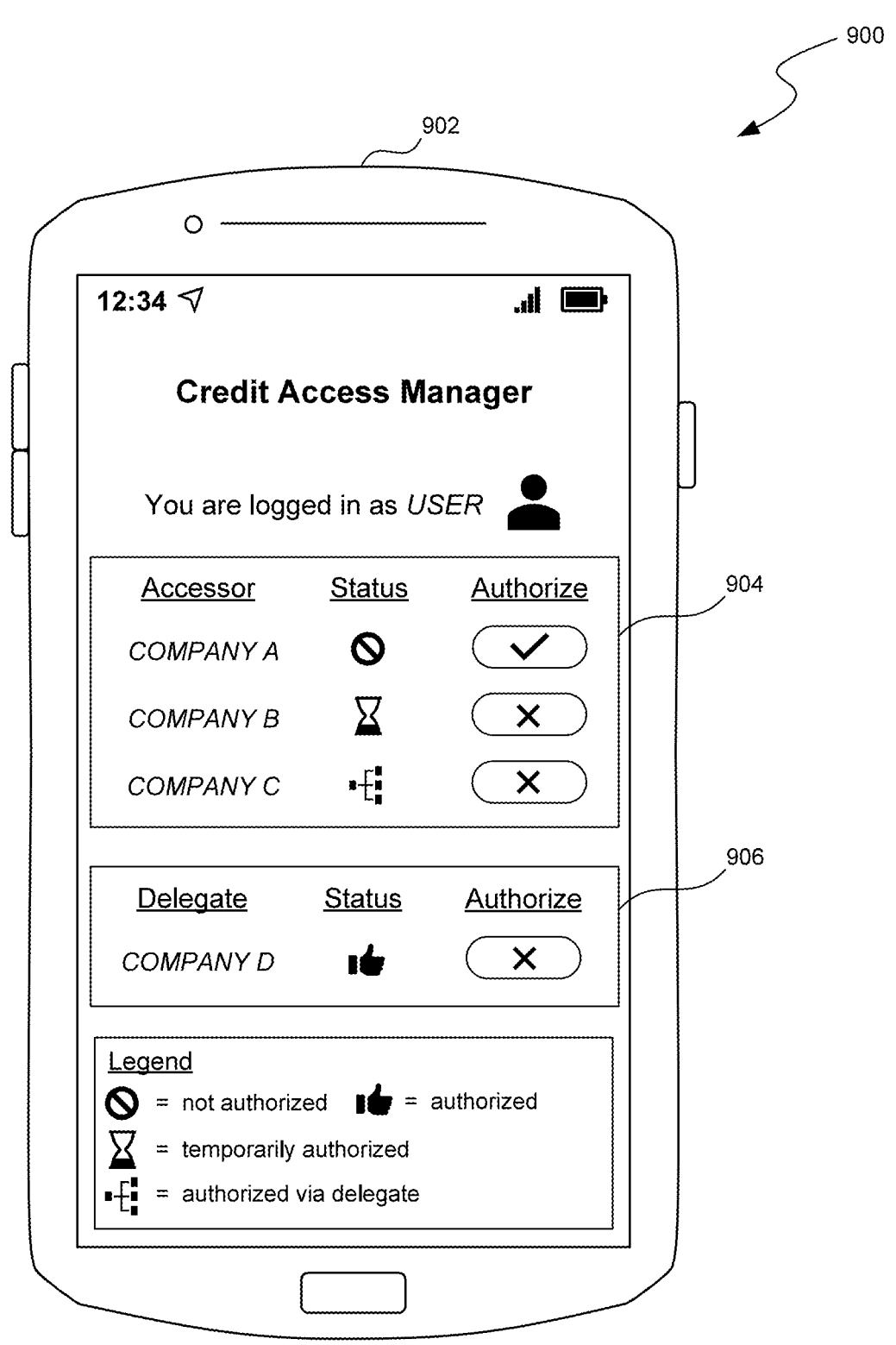
FIG. 9A is a diagram illustrating an example user interface for managing access to a user's credit information.

FIG. 9A is a diagram 900 illustrating an example user interface (UI) for managing access to a user's credit information on a user's client device 902. More particularly, diagram 900 shows an example UI for a user application that interfaces with a credit information access manager. The UI includes an accessor management section 904, which allows the user to view the status of and manage previous and current accessor authorizations. The UI also includes a delegate management section 906, which enables the user to view the status of and manage their delegates.

Accessor management section 904 includes a list of accessors, their respective authorization statuses, and interactive elements to respectively authorize or revoke authorization of each accessor. As shown in FIG. 9A: Company A is listed as being unauthorized next to a button for the user to authorize Company A to access their credit information; Company B is shown as temporarily authorized next to a button to manually revoke their current authorization; and Company C is shown to be authorized via a delegate next to a button to manually revoke their current authorization. Company A may have, for example, been previously authorized by the user to access their credit information, with that authorization being expired when the accessor management section 904 of the UI was rendered.

Delegate management section 906 shows that Company D is currently authorized as a delegate to act on behalf of the user next to a button to revoke that delegate authorization. In some implementations, delegate management section 906 may include interactive UI elements to enable the user to view more specific details about each authorization, such as the start date and time, expiration date and time, and conditions and/or metadata associated with each authorization.

Figure 9B:
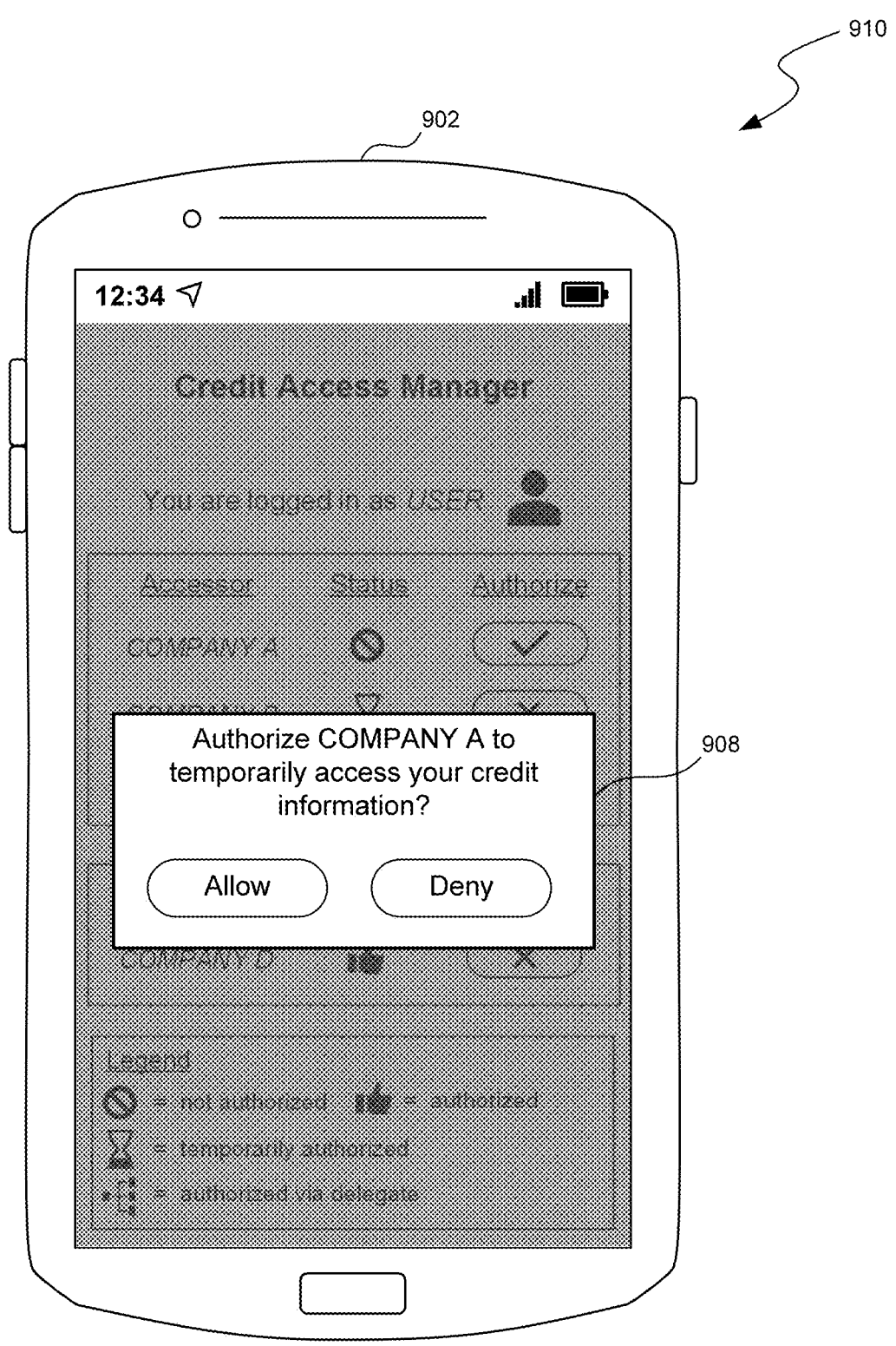
FIG. 9B is a diagram illustrating an example user interface for authorizing a third party accessor access to a user's credit information.

FIG. 9B is a diagram 910 illustrating an example user interface for authorizing a third party accessor access to a user's credit information. For example, if the user presses the button next to Company A to authorize Company A to access their credit information, the user application causes confirmation window 908 to asking the user to confirm the authorization. In some implementations, the confirmation window 908 may also provide information about the default user settings (e.g., authorization expiration time, number of credit inquiries permitted, etc.), and/or may provide input fields for overriding those default settings for the particular authorization of Company A.

Figure 9C:
FIG. 9C is a diagram illustrating an example user interface for a third party accessor to access a user's credit information.

FIG. 9C is a diagram 920 illustrating an example user interface for a third party accessor to access a user's credit information on an accessor's client device 922. More particularly, diagram 920 shows an example UI for an accessor application that interfaces with a credit information access manager. The UI includes a notification section 924, a credit request button 926, a QR code 928, and an expiration section 930. The UI shown in FIG. 9C may be generated on the accessor's client device 922 after the user authorizes Company A in the example shown in FIGS. 9A and 9B.

The notification section 924 includes a message informing the accessor that the user has granted them access to view the user's credit information. The accessor may access the credit information within the accessor application by pressing the credit request button 926, which transmits a request with an identifier to the credit information access manager. Alternatively, the accessor may scan the QR code 928 with a separate client device to access the user's credit information. The expiration section 930 informs the accessor that the identifier is set to expire in 4 minutes, prompting the accessor to access the user's credit information before the automatic expiration is processed.

Figure 9D:
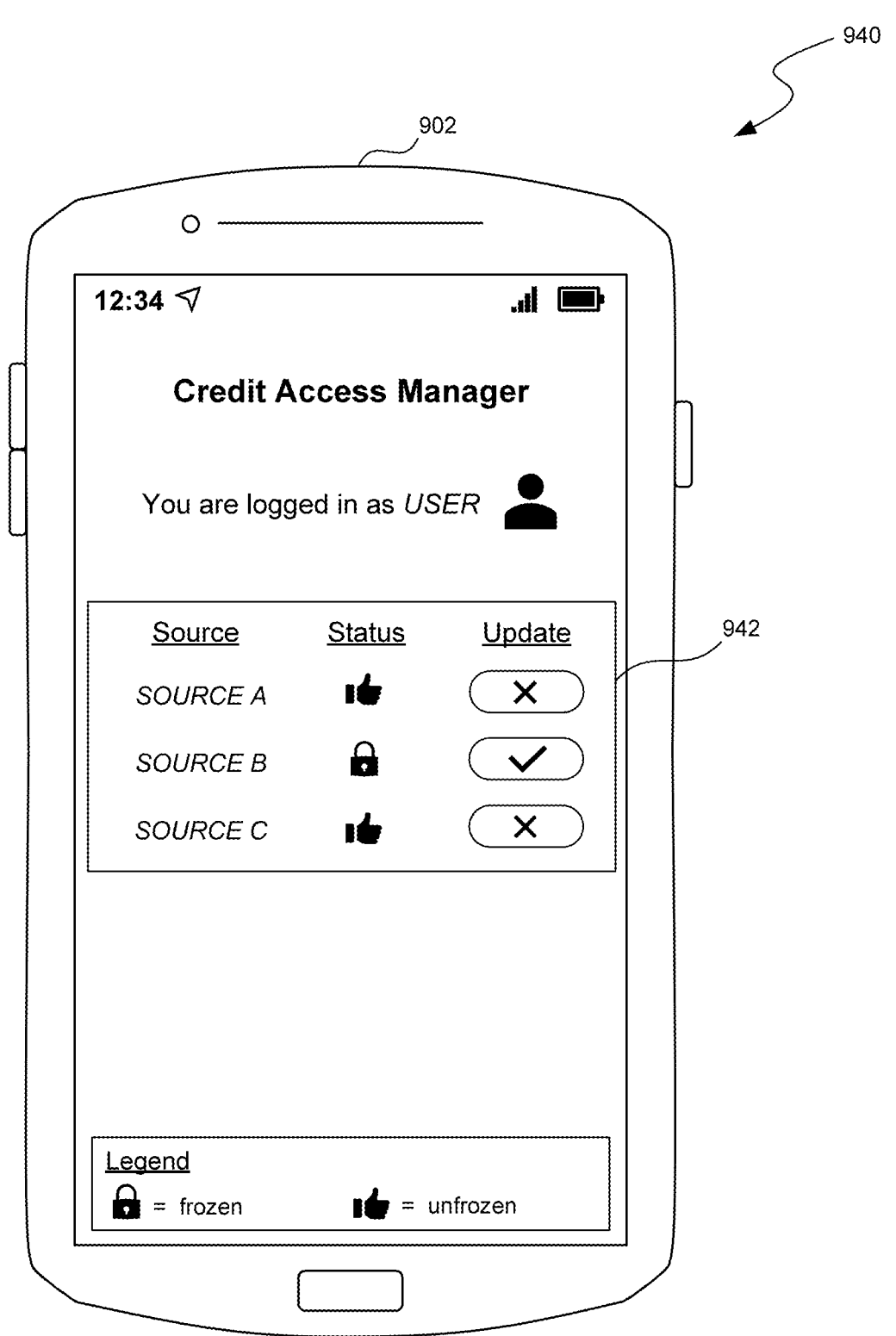
FIG. 9D is a diagram illustrating an example user interface for controlling access to credit information from credit information sources.

In addition to managing the authorization of accessors and delegates, users may also wish to control access to their credit information from credit information sources, such as credit bureaus. In some instances, credit bureaus and other similar organizations may permit individuals or entities to selectively lock or "freeze" their accounts to prevent anyone from accessing credit information. FIG. 9D is a diagram 940 illustrating an example user interface for controlling access to credit information from credit information sources.

More particularly, diagram 940 shows an example UI for a user application, which includes a source management section 942. The source management section 942 includes a list of sources, their respective status (e.g., frozen or unfrozen), and interactive elements to freeze or unfreeze access to their credit information for each respective credit information source. As shown in FIG. 9D: Source A is listed as unfrozen next to a button to freeze their account with Source A; Source B is listed as frozen next to a button to unfreeze their account with Source B; and Source C is listed as unfrozen next to a button to freeze their account with Source C. Source B may have, for example, recently experienced a cybersecurity incident that could expose the user to an elevated risk of identity theft. The user may have manually frozen their account via the user application, or the credit information access manager might have dynamically updated the status of Source B to frozen in response to the reporting of the cybersecurity incident.

It will be appreciated that the contents, layout, and styling of a user application's UI may vary among different implementations, and that the examples shown in FIGS. 9A-9D are provided for explanatory purposes only.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for controlling access to credit information, the method comprising:

receiving, from a first device associated with a first user, a first request to provide temporary access, to credit information associated with the first user, to a third party;

generating an identifier associated with the first request, wherein the identifier authorizes the transfer of at least a portion of the credit information to the third party;

providing, in response to the first request, the identifier to the first device, wherein, the first device, in response to the providing, displays a matrix barcode that encodes the identifier, and a second device, associated with the third party, scans the displayed matrix barcode to obtain the identifier;

receiving, from the second device, a second request with the identifier, the second request comprising a request type and a role of the third party with respect to the credit information;

in response to the second request retrieving, from one or more credit information systems, the credit information;

selectin a predefined standardized structure by:

analyzing the request type and the role of the third party with respect to the credit information; and resolvin a level of detail for the predefined standardized structure based on the analyzing;

converting the retrieved credit information into a data structure comprising the predefined standardized structure, wherein the converting selectively populates the data structure based on the predefined standardized structure and the resolved level of detail by a) transforming one or more first data elements of the retrieved credit information, and b) omitting one or more second data elements of the retrieved credit information;

transmitting the data structure to the second device associated with the third party; and after transmitting the data structure, automatically invalidating the identifier to deauthorize subsequent requests with the identifier from transmitting credit information associated with the first user to the third party.

2. The method of claim 1, wherein generating the identifier further comprises generating an expiration time for the identifier, wherein the identifier authorizes the transfer of at least a portion of the credit information to the third party before the expiration time, and wherein the retrieving the credit information as user is further in response to second request with the identifier having been received before the expiration time.

3. The method of claim 2, further comprising:

determining that a current time is after the expiration time, wherein the automatically invalidating the identifier is based on the determination that the current time is after the expiration time.

4. The method of claim 1, wherein the identifier is configured to be deauthorized after a single use in a request for credit information, and wherein the automatically invalidating the identifier is in response to transmitting the data structure to the second device associated with the third party.

5. The method of claim 1, wherein the request type comprises a credit check type indicating a reason for the second request by the third party for credit information.

6. The method of claim 1, wherein the identifier is further associated with the third party, wherein the method further comprises:

receiving, from the second device, credentials associated with the third party; and determining that the credentials and the identifier are both associated with the third party, wherein the data structure is transmitted to the second device after determining that the credentials and the identifier are both associated with the third party.

7. The method of claim 1, wherein a monetary value is associated with the first request and/or the second request, and wherein the level of detail defined for the predefined standardized structure is based on the request type, the role of the third party with respect to the credit information, and the monetary value.

8. The method of claim 1, wherein the transforming retains at least a portion of the one or more first data elements of the retrieved credit information.

9. The method of claim 1, wherein an application is configured to display user interface (UI) elements that correspond to the data elements selectively populated to the data structure.

10. A computing system for controlling access to credit information, the computing system comprising:

one or more processors; and one or more memories storing instructions that, when executed by the one or more processors, cause the computing system to perform a process comprising:

receiving, from a first device associated with a first user, a first request to provide temporary access, to credit information associated with the first user, to a third party;

generating an identifier associated with the first request, wherein the identifier authorizes the transfer of at least a portion of the credit information to the third party;

providing, in response to the first request, the identifier to the first device, wherein, the first device, in response to the providing, displays a matrix barcode that encodes the identifier, and a second device, associated with the third party, scans the displayed matrix barcode to obtain the identifier;

receiving, from the second device, a second request with the identifier, the second request comprising a request type and a role of the third party with respect to the credit information;

in response to the second request retrieving, from one or more credit information systems, the credit information;

selecting a predefined standardized structure by:

analyzing the request type and the role of the third party with respect to the credit information; and resolving a level of detail for the predefined standardized structure based on the analyzing;

converting the retrieved credit information into a data structure comprising the predefined standardized structure, wherein the converting selectively populates the data structure based on the predefined standardized structure and the resolved level of detail by a) transforming one or more first data elements of the retrieved credit information, and b) omitting one or more second data elements of the retrieved credit information;

transmitting the data structure to the second device associated with the third party; and after transmitting the data structure, automatically invalidating the identifier to deauthorize subsequent requests with the identifier from transmitting credit information associated with the first user to the third party.

11. The computing system of claim 10, wherein generating the identifier further comprises generating an expiration time for the identifier, wherein the identifier authorizes the transfer of at least a portion of the credit information to the third party before the expiration time, and wherein the retrieving the credit information is further in response to second request with the identifier having been received before the expiration time.

12. The computing system of claim 11, wherein the process further comprises:

determining that a current time is after the expiration time, wherein the automatically invalidating the identifier is based on the determination that the current time is after the expiration time.

13. The computing system of claim 10, wherein the identifier is further associated with the third party, wherein the process further comprises:

receiving, from the second device, credentials associated with the third party; and determining that the credentials and the identifier are both associated with the third party, wherein the data structure is transmitted to the second device after determining that the credentials and the identifier are both associated with the third party.

14. A computer-readable storage medium storing instructions that, when executed by a computing system, cause the computing system to perform a process for controlling access to credit information, the process comprising:

receiving, from a first device associated with a first user, a first request to provide temporary access, to credit information associated with the first user, to a third party;

generating an identifier associated with the first request, wherein the identifier authorizes the transfer of at least a portion of the credit information to the third party;

providing, in response to the first request, the identifier to the first device, wherein, the first device, in response to the providing, displays a matrix barcode that encodes the identifier, and a second device, associated with the third party, scans the displayed matrix barcode to obtain the identifier;

receiving, from the second device, a second request with the identifier, the second request comprising a request type and a role of the third party with respect to the credit information;

in response to the second request retrieving, from one or more credit information systems, the credit information;

selecting a predefined standardized structure by:

analyzing the request type and the role of the third party with respect to the credit information; and resolving a level of detail for the predefined standardized structure based on the analyzing;

converting the retrieved credit information into a data structure comprising the predefined standardized structure, wherein the converting selectively populates the data structure based on the predefined standardized structure and the resolved level of detail by a) transforming one or more first data elements of the retrieved credit information, and b) omitting one or more second data elements of the retrieved credit information;

transmitting the data structure to the second device associated with the third party; and after transmitting the data structure, automatically invalidating the identifier to deauthorize subsequent requests with the identifier from transmitting credit information associated with the first user to the third party.

15. The computer-readable storage medium of claim 14, wherein generating the identifier further comprises generating an expiration time for the identifier, wherein the identifier authorizes the transfer of at least a portion of the credit information to the third party before the expiration time, wherein the retrieving the credit information is further in response to second request with the identifier having been received before the expiration time.

16. The computer-readable storage medium of claim 15, wherein the process further comprises:

determining that a current time is after the expiration time, wherein the automatically invalidating the identifier is based on the determination that the current time is after the expiration time.

17. The computer-readable storage medium of claim 14, wherein the identifier is configured to be deauthorized after a single use in a request for credit information, and wherein the automatically invalidating the identifier is in response to transmitting the data structure to the second device associated with the third party.

18. The computer-readable storage medium of claim 14, wherein the identifier is further associated with the third party, wherein the process further comprises:

receiving, from the second device, credentials associated with the third party; and determining that the credentials and the identifier are both associated with the third party, wherein the data structure is transmitted to the second device after determining that the credentials and the identifier are both associated with the third party.

19. The computer-readable storage medium of claim 14, wherein the process further comprises:

transmitting a notification to at least one of the first device and the second device indicating that the identifier has been automatically invalidated.

* * * * *